United States Patent [19]
Verschuur

[11] 3,826,279
[45] July 30, 1974

[54] OIL/WATER PIPELINE INLET WITH MEANS FOR PRODUCING A UNIFORM OIL VELOCITY

[75] Inventor: Eke Verschuur, Amsterdam, Netherlands

[73] Assignee: Shell Oil Company, Houston, Tex.

[22] Filed: Jan. 13, 1972

[21] Appl. No.: 217,496

[30] Foreign Application Priority Data
Apr. 29, 1971 Netherlands .................. 7105973

[52] U.S. Cl. ................................ 137/604, 137/13
[51] Int. Cl. ............................................. F17d 1/16
[58] Field of Search ............... 137/13, 604; 138/41

[56] References Cited
UNITED STATES PATENTS
| | | | |
|---|---|---|---|
| 3,414,004 | 12/1968 | Bankston | 137/13 X |
| 3,502,103 | 3/1970 | Verschuur | 137/13 |
| 3,519,024 | 7/1970 | Johnson | 138/41 |

*Primary Examiner*—Alan Cohan
*Attorney, Agent, or Firm*—Fredrik Marlowe

[57] ABSTRACT

An inlet piece for a pipeline for the transport of a viscous liquid surrounded by an annular layer of a liquid with a lower viscosity, which liquids are entirely or substantially insoluble with respect to each other, composed of a central channel, provided with at least one inlet and with an exit for the viscous liquid, a chamber surrounding that central channel, provided with at least one inlet for the liquid with a lower viscosity and with an annular outlet for that liquid which is so positioned as to surround the exit for the viscous liquid, and a rotation-symmetrical connecting piece for the connection to the pipeline; and a process for the transport of those liquids through a pipeline.

2 Claims, 6 Drawing Figures

OIL/WATER PIPELINE INLET WITH MEANS FOR PRODUCING A UNIFORM OIL VELOCITY

BACKGROUND OF THE INVENTION

The term liquid is here taken to include liquids having non-Newtonian properties. The viscous liquid will hereinafter be referred to as oil, the liquid with a lower viscosity as water.

A known application of the above-mentioned process is the transport of oil through pipelines, water or a liquid phase substantially consisting of water being used as the liquid with a lower viscosity. Here the oil moves in the form of a long plug through the center of the pipeline, the water forming a layer between the oil and the wall of the pipeline. Since the friction between water and wall is much lower than that between oil and wall, the resistance to flow is considerably smaller than in the pumping of oil only. In this way it is even possible for very stiff oils or oils of temperatures lying below the pour point to be transported through a pipeline.

In this connection it is of great importance that no oil drops are present in the water besides the central oil plug. Oil drops dispersed in the water layer would considerably increase the thickness of that layer necessary to separate the central oil plug from the wall. As a result a smaller part of the volume transported would consist of oil, while in addition the separation between water and oil after transport would be more difficult.

It has been found that the formation of oil drops occurs there where water and oil are added one to the other; oil drops then form more readily when the viscosity of the oil is lower.

As a result of the presence of the annular outlet for the water round about the exit for oil, immediately after oil and water having been added one to the other an annular layer of water is formed around the oil. The formation of oil drops is in the first place determined by the local average velocity of flow of the oil. The higher that velocity, the greater the chance of drops being formed.

In the present process of transport the average velocity of flow in the pipeline is as a rule higher than 0.5 m/s. This lower limit is related to the phenomenon that at lower flow velocities there is a risk of the oil plug penetrating through the annular layer of water and contacting the wall of the pipeline, which is undesirable.

Oil flow velocities higher than 0.5 m/s, however, often give rise to the formation of drops when the annular layer of water is formed. Peripheral effects in the velocity profile of the oil play an important role here.

SUMMARY OF THE INVENTION

The invention provides a process and means by which at high flow velocities, too, water and oil can be introduced into the pipeline in such a way that the desired flow pattern develops without oil drops being formed.

The invention therefore relates to an inlet piece and process for the use thereof as described hereinbefore, in which inlet piece a. the central channel on the side of the exit over a length at least equal to half the diameter of the exit is rotation-symmetrical and substantially cylindrical and in a coaxial position relative to the pipeline, b. one or more resistances are installed inside the central channel, close to the exit, which resistances promote a velocity of a liquid flowing through that channel that is uniform over the cross-sectional area, and c. the cross-sectional area of the exit for the viscous liquid amounts to at least 50 percent of the cross-sectional area of the pipeline.

DESCRIPTION OF THE PREFERRED EMBODIMENT

Figure 1:
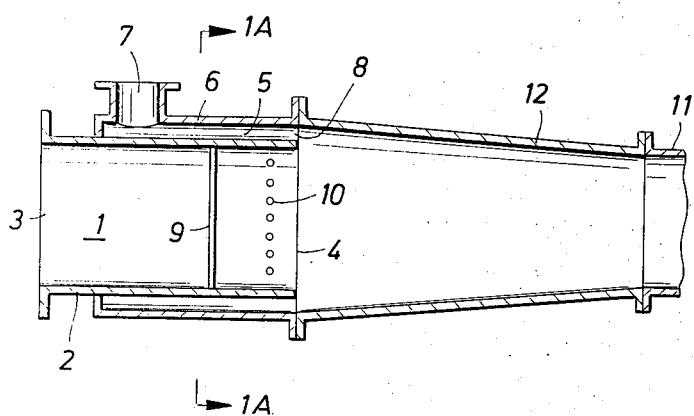
FIG. 1 shows a longitudinal section and a cross section through an inlet piece according to the invention provided with grates.
Figure 1A:
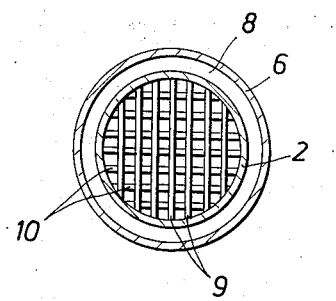

The resistances employed in accordance with the present invention ensure that the velocity of the oil flow is more evenly distributed over the cross-sectional area of the exit of the central channel. As a result the peripheral effects in the velocity profile are considerably reduced and drop formation is much less dependent on the average velocity of oil flow. Then, at high velocities of oil flow, too, the transport can be carried out with a very thin water layer, even when the oils have a low viscosity. Also, when higher flow velocities are applied, the risk of the oil penetrating through the annular water layer and contacting the wall decreases. Therefore, the inlet piece can very well be used in any position.

Since the use of the resistances allows a higher velocity of flow in the exit of the central channel, the cross-sectional area of that exit is to a high degree independent of the cross-sectional area of the pipeline and may, for instance, lie within the range between 0.5 and 1.5 times the latter area. The connecting piece preferably has the shape of part of the curved surface of a cone.

The width of the annular outlet is preferably chosen such that the difference between the average velocities of outflow of the two liquids is less than 0.5 m/s. The ratio between the quantities of water and oil to be used in pumping oil through a pipeline may vary between wide limits. It is therefore impossible to relate the width of the annular outlet to the cross-sectional area of the exit of the central channel. However, when starting from the desideratum, formulated hereinbefore, concerning the difference between the average velocities of outflow, someone skilled in the art will be perfectly able to determine the appropriate width of the annular outlet. Likewise, someone skilled in the art will be able to determine the dimensions and the design of the annular outlet and of the second chamber with respect to each other such that an annular water layer is obtained whose velocity of flow and thickness are substantially the same along its whole circumference.

In many cases the inlet piece can be designed such that the diameter of the exit of the central channel is substantially equal to the diameter of the pipeline, minus twice the width of the annular outlet. The connecting piece can then be cylindrical and can have the same diameter as the pipeline. This allows a very simple and compact design of the inlet piece.

The resistances used may in general be chosen such as to increase the resistance to flow for a liquid flowing through the central channel. They may, for instance, be formed by grates, which may consist of a number of round bars. The pressure drop the oil is subjected to in flowing through these grates has an equalizing effect on differences in flow velocity. If two or more grates are employed to increase the effect, it is recommended to choose different directions for the bars of the successive grates, to eliminate an effect of the direction of the bars on the flow velocity distribution.

The resistances may also consist of perforated plates. Furthermore, a combination of grates and perforated plates may be applied. Both grates and perforated plates may be designed such that the free area of the resistances decreases towards the center. In that case a specific effect may be exerted on the flow velocity distribution by a larger free area of the resistances, which means a decrease of the pressure drop. A very suitable embodiment is that in which the resistances are formed by a number of baffles placed in the axial direction which divide the central channel into a number of subchannels. In all these subchannels substantially the same flow pattern will develop, so on the side of the exit of those subchannels a flow will prevail whose velocity is evenly distributed over the whole cross-sectional area of the central channel. The thickness of the baffles does not affect the flow and may therefore be chosen such as is justified from the point of view of construction. For instance, a simple embodiment is that in which two mutually perpendicular baffles divide the channel into four segments.

A high degree of uniformity of the flow is attained when the sections of all the subchannels perpendicular to the center lines thereof have substantially the same form and/or the same area.

In many cases it is desirable that the length of the subchannels is at least equal to the smallest dimension of the cross section thereof. In general a greater length of the channels is required according as the viscosity of the oil is lower. It is favorable for the cross section of the subchannels to have substantially the shape of a regular hexagon. With this shape a very even distribution of the velocity of flow can be attained with a comparatively small surface area of the walls of the channels, so that the decrease in flow rate is only small.

It may be useful for the baffles, at least for a part of them, to extend over the entire length of the central channel, and for each of the subchannels bounded by those baffles and, possibly, by a part of the wall of the central channel, to communicate with a separate inlet. This makes it possible to attain a very even distribution of the velocity of flow of the viscous liquid with a small total surface area of the baffles.

The central channel may on the side of the exit be provided with a collar consisting of flexible material. This enables the width of the annular outlet to adjust itself to the thickness of the annular water layer, which is determined by the quantity of water introduced.

The invention further provides a process for the transport through a pipeline of a viscous liquid surrounded by an annular layer of liquid with a low viscosity, which liquids are entirely or substantially insoluble with respect to each other, in which process the two liquids are introduced with the aid of an inlet piece as described, the volume flow rate of the liquid with a low viscosity lying between the limits of 0.1 and 25 percent of the volume flow rate of the viscous liquid. The process can be carried out with a very small decrease in flow rate with the aid of an inlet piece in which the baffles, at least a part of them, extend over the whole length of the central channel and each of the subchannels bounded by those baffles and possibly, by a part of the wall of the central channel, communicates with a separate inlet, and in which the volume flow through the inlets for the viscous liquid is substantially proportional to the area of the cross section — at the location of the exit — of the subchannels bounded by the baffles extending over the whole length of the central channel and, possibly, by the wall of the central channel. Very favorable results are reached when the difference between the average velocities of outflow of the two liquids, respectively from the exit and from the outlet, is less than 0.5 m/s.

It is of great importance that oil can now be transported through a pipeline with only very small quantities of water. It has been found that the pressure drop involved is at most equal to that of water at the same average velocity of flow, irrespective of the viscosity of the oil. In many cases the pressure drop even amounts to only 60–80 percent thereof. This is a result of the absence of currents or vortices in the central core, which is now occupied by less mobile or even stiff oil. Formation of drops of oil in water does not occur, not even in the case of oils with a low viscosity, such as, for instance, 100 cSt. The process according to the invention thus offers the following possibilities and advantages:

Very viscous oils which without this process could not be transported can now be pumped with very little water. Oils which at normal temperature are very viscous are often supplied at a comparatively high temperature, the viscosity in the initial part of the pumping process thus being low. Notwithstanding this low viscosity, introduction with a surrounding annular layer of water without the occurrence of drop formation can now be effected by the apparatus and the process according to the invention, while no problems for the transport arise from the drop in temperature farther on in the pipeline. Also, oils with a low viscosity can now be transported by the process according to the invention, which implies that the capacity of the pipeline can be increased considerably, since the pressure drop in the pipeline is at most equal to that of water at the same average velocity of flow, while the required volume of water relative to the quantity of oil transported by pumping can be negligibly small.

In FIG. 1 the central channel bounded by the cylindrical wall 2 is represented by item 1. The central channel is provided with an inlet for oil 3 and with an exit for oil 4. The central channel is surrounded by chamber 5, which is bounded on the inside by a part of the wall 2 of the central channel and on the outside by the wall 6. The chamber is provided with an inlet 7 and with an annular outlet 8. In the central channel two grates 9 and 10 are present. The bars of grate 9 are in the vertical position, those of grate 10 in the horizontal position. Between the inlet piece and the pipeline 11 there is present a connecting piece which has the shape of a part of the curved surface of a cone and of which the area of the cross section perpendicular to the center line is larger on the side of the inlet piece than on the side of the pipeline.

Figure 2:
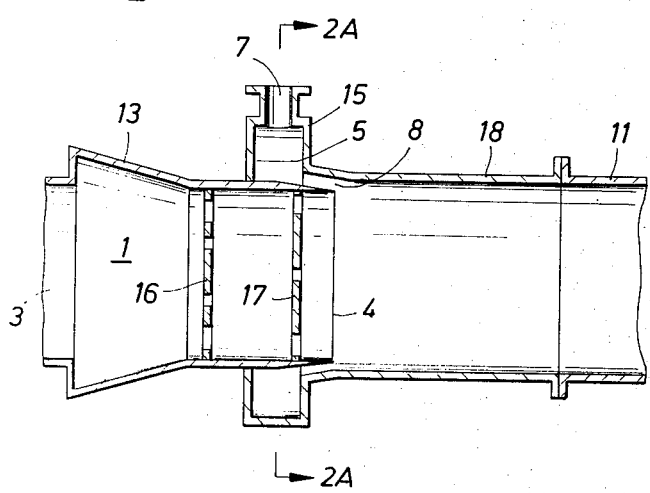
FIG. 2 shows a longitudinal section and a cross section through an inlet piece provided with perforated plates.
Figure 2A:
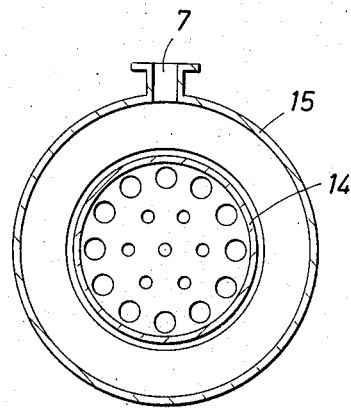

In FIG. 2 the central channel 1 is bounded on the side of the inlet 3 by a wall section 13 which has the shape of part of the curved surface of a cone and on the side of the exit 4 by a cylindrical wall section 14. The wall section 14 is near the exit 4 bevel-edged on the outside. The central channel is surrounded by a chamber 5 which is bounded by part of the cylindrical wall 14 and the wall 15, and provided with inlet 7 and annular outlet 8. The central channel, within the cylindrical part thereof, is provided with two perforated plates 16 and 17, the free area of which plates decreases towards the center. The inlet piece is connected to the pipeline 11 by means of a cylindrical connecting piece 18.

Figure 3:
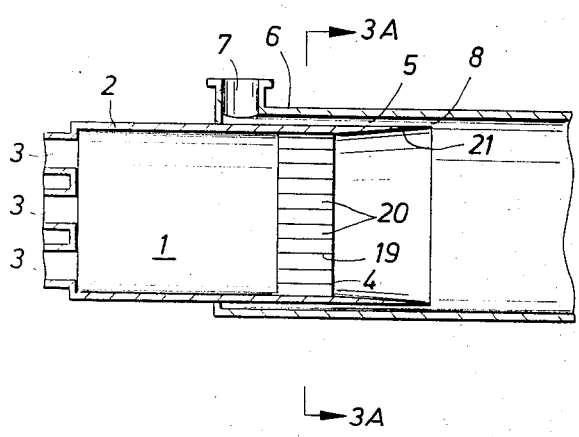
FIG. 3 shows an inlet piece in longitudinal section and cross section, of which inlet piece the central channel is provided with axial baffles and with a flexible collar.
Figure 3A:
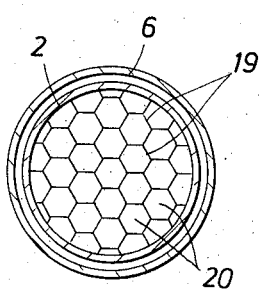

In FIG. 3 the central channel 1 is bounded by wall 2 and provided with inlets 3 and an exit 4. The chamber 5 is bounded by the walls 2 and 6 and is provided with inlet 7 and annular outlet 8. In the central channel baffles 19 are present which divide this channel into a number of subchannels 20 with a hexagonal cross section. On the side of the exit of the central channel a collar 21 of flexible material is present.

The invention will now be further elucidated with the aid of some examples.

EXAMPLE I

In a test pipe of 140 mm diameter oil and water were introduced with the aid of an inlet piece substantially according to the embodiment represented in FIG. 3. Use was made of a "Boscan" crude oil at temperatures of 50° – 80° C; in the test the viscosity of the oil varied between 1,000 and 5,000 cP, the density was about 0.995 of the density of water. With quantities of water of 0.5 – 15 percent, at flow velocities of 0.18 – 2.3 m/s, an annular water layer without dispersed oil drops could be obtained.

EXAMPLE II

In the apparatus according to Example I a 3,000 s fuel oil was pumped at temperatures of 10° – 50° C; in this test the viscosity of the oil varied between 1,000 and 10,000 cP, the density between 0.945 and 0.965 of the density of the water. Again with quantities of water of 0.5 – 15 percent, at flow velocities of 0.18 – 2.3 m/s, an annular water layer without oil drops was obtained.

EXAMPLE III

In the same apparatus a 500 s fuel oil was pumped at temperatures of 10° – 50° C; in this test the viscosity of the oil varied between 150 and 1,500 cP, the density between 0.930 and 0.945 of the density of water. Again with quantities of water of 0.5 – 15 percent, at flow velocities of 0.18 – 2.3 m/s, an annular water layer without oil drops was obtained.

I claim as my invention:

1. An inlet piece for a pipeline for the transport of a viscous liquid surrounded by an annular layer of a liquid with a lower viscosity, which liquids are at least substantially insoluble in each other, comprising:
   a central channel, provided with at least one inlet and with an exit for the viscous liquid;
   a chamber surrounding the central channel, provided with at least one inlet for the liquid with a lower viscosity and with an annular outlet for the liquid which is positioned to surround the exit for the viscous liquid; and
   a rotation-symmetrical connecting piece for connection to the pipeline, in which inlet piece
   a. the central channel on the side of the exit over a length at least equal to half the diameter of the exit is rotation-symmetrical and substantially cylindrical and in a coaxial position relative to the pipeline,
   b. at least one resistance is installed inside the central channel, close to the exit, which resistance promotes a velocity of a liquid flowing through the channel that is uniform over the cross-sectional area, the resistance being formed by baffles placed in the axial direction which divide the central channel into subchannels having cross-sectional areas substantially in the shape of regular hexagons, the sections of all the subchannels being perpendicular to the center lines thereof and having substantially the same form and the same area, and the length of the subchannels being at least equal to the smallest dimension of the cross section thereof, and
   c. the cross-sectional area of the exit for the viscous liquid amounts to at least 50 percent of the cross-sectional area of the pipeline.

2. An inlet piece according to claim 1 wherein at least part of the baffles extend over the length of the central channel, and for each of the subchannels bounded by those baffles communicates with a separate inlet.

* * * * *